(12) United States Patent
Pari et al.

(10) Patent No.: US 12,029,176 B2
(45) Date of Patent: Jul. 9, 2024

(54) PLANT HOLDER FOR HYDROPONIC SYSTEM

(71) Applicant: GROW PIPES AB, Gothenburg (SE)

(72) Inventors: Mikael Pari, Vallda (SE); Jonas Pari, Satila (SE); Christer Tilk, Hovers (SE); Robert Carlsson, Gothenburg (SE); Gert Christiaan Delport, Guateng (ZA)

(73) Assignee: GROW PIPES AB (SE)

( * ) Notice: Subject to any disclaimer, the term of this patent is extended or adjusted under 35 U.S.C. 154(b) by 146 days.

(21) Appl. No.: 17/625,786

(22) PCT Filed: Jul. 2, 2020

(86) PCT No.: PCT/SE2020/050703
§ 371 (c)(1),
(2) Date: Jan. 10, 2022

(87) PCT Pub. No.: WO2021/010882
PCT Pub. Date: Jan. 21, 2021

(65) Prior Publication Data
US 2022/0272908 A1   Sep. 1, 2022

(30) Foreign Application Priority Data
Jul. 12, 2019 (SE) .................................... 1950889-4

(51) Int. Cl.
*A01G 9/02* (2018.01)
*A01G 31/06* (2006.01)

(52) U.S. Cl.
CPC ............. *A01G 9/022* (2013.01); *A01G 31/06* (2013.01)

(58) Field of Classification Search
CPC ........ A01G 9/022; A01G 31/00; A01G 31/02; A01G 31/06
See application file for complete search history.

(56) References Cited

U.S. PATENT DOCUMENTS 4,389,813 A * 6/1983 Jaques .................... A01G 9/022
                                                        428/18
4,622,777 A * 11/1986 Greene, Jr. ............. A01G 9/022
                                                        47/67

(Continued)

FOREIGN PATENT DOCUMENTS

CN          106212220 A     12/2016
KR          20120094404      8/2012

(Continued)

OTHER PUBLICATIONS

International Search Report and Written Opinion mailed Sep. 15, 2020; International Patent Application No. PCT/SE2020/050703 filed on Jul. 2, 2020.

*Primary Examiner* — Kristen C Hayes
(74) *Attorney, Agent, or Firm* — McDonald Hopkins LLC (57) ABSTRACT

Plant holder for a hydroponic growth system, comprising a body having a top section, a middle section and a bottom section, where the plant holder comprises a first conduit having a rear wall and a front wall, where the plant holder comprises a plant hopper with a plant mouth arranged at the top section, where the first conduit comprises a sloping bottom wall having an outlet opening arranged at the bottom section, where the plant holder further comprises a lid arranged at the plant mouth, where the lid comprises a collector plate extending from the interior of the first conduit into the plant hopper, where the collector plate ends outside of the periphery of the plant holder.

14 Claims, 4 Drawing Sheets

(56) References Cited

U.S. PATENT DOCUMENTS

| | | |
|---|---|---|
| 5,826,375 A | 10/1998 | Black |
| 6,389,751 B1 | 5/2002 | Wang |
| 2015/0313104 A1* | 11/2015 | Cottrell ............... A01G 22/00 47/62 A |
| 2016/0143234 A1 | 5/2016 | Nasu |
| 2020/0008378 A1* | 1/2020 | Van Buuren ......... A01G 27/005 |

FOREIGN PATENT DOCUMENTS

| | | |
|---|---|---|
| RU | 2163755 C1 | 3/2001 |
| WO | 2016162856 A1 | 10/2016 |
| WO | 2018065910 A1 | 4/2018 |
| WO | 2018116225 | 6/2018 |
| WO | 2019075495 | 4/2019 |
| WO | WO-2019075495 A1 * | 4/2019 |

\* cited by examiner

PLANT HOLDER FOR HYDROPONIC SYSTEM

CROSS-REFERENCE TO RELATED APPLICATION

This application is a 35 U.S.C. § 371 national stage application of PCT Application No. PCT/SE2020/050703 filed on Jul. 2, 2020, entitled "PLANT HOLDER FOR HYDROPONIC SYSTEM," which claims priority to Swedish Patent Application No. 1950889-4 filed on Jul 12, 2019, each of which are incorporated herein in their entirety by reference.

TECHNICAL FIELD

The present invention relates to a plant holder to be used in hydroponic growth systems.

BACKGROUND ART

Different hydroponic systems and arrangements are known in the art. The systems may be arranged for horizontal or vertical growth of plants. Vertically stacked hydroponic systems are getting more and more popular since they may be arranged in a very space efficient manner.

Some existing vertical hydroponic planters have a relatively complicated design. WO 2016/162856 A1, WO 2018/065910 A1 and WO 2018/116225 A1 all show a system comprising modular planters that are stacked on each other to provide a vertical hydroponic growth system. The planters are assembled from two parts that are glued together.

These solutions may work fine for some situations, but there is still room for improvements.

DISCLOSURE OF INVENTION

An object of the invention is therefore to provide an improved plant holder that is easy to manufacture. A further object is to provide an improved plant holder that comprises few parts. A further object of the invention is to provide a plant holder arrangement comprising a plurality of plant holders.

The solution to the problem according to the invention is described in the characterizing part of claim 1 for the plant holder and in claim 14 for the plant holder arrangement. Further claims are directed to advantageous embodiments and further developments of the plant holder and plant holder arrangement.

In a plant holder for a hydroponic growth system, comprising a body having a top section, a middle section and a bottom section, where the plant holder comprises a first conduit having a rear wall and a front wall, where the plant holder comprises a plant hopper with a plant mouth arranged at the top section, where the first conduit comprises a sloping bottom wall having an outlet opening arranged at the bottom section, the object of the invention is achieved in that the plant holder further comprises a lid arranged at the plant mouth, where the lid comprises a collector plate extending from the interior of the first conduit into the plant hopper, where the collector plate ends outside of the periphery of the plant holder.

By this first embodiment of the plant holder according to the invention, the plant holder will provide a plant holder that is easy and cost-effective to produce. The plant holder will allow a simple hydroponic growth system that is easy to assemble, and that will not leak since it does not comprises any vertical joints that are glued together. The plant holder comprises a sloping bottom wall adapted to collect water from the first conduit and to direct the water to the collector plate of the lid. In a first example, the rear wall is straight and flat, which allows the plant holder to be mounted close to a wall. By dividing the plant holder in an upper and a lower part, and by having a separate lid, the plant holder may be produced in an easy and cost-effective way by using two part tools. The plant holder comprises a lid that is positioned at the plant mouth and that is adapted to hold a plant in a plant opening. The lid comprises a collector plate adapted to lead water from the first conduit into the plant hopper. By the use of a collector plate to lead water from the first conduit to the plant hopper, and thus directly to a plant arranged in the plant opening, the fibre matrix holding the plant may be smaller than in conventional plant holders.

In an advantageous development of the invention, the plant holder comprises a second conduit arranged adjacent the first conduit. The second conduit is identical to the first conduit, but is offset in a vertical direction, such that the plant hopper of the second conduit is arranged at the sloping bottom wall of the first conduit. In this way, a plant holder arrangement comprising such plant holders will have plant hoppers that are evenly distributed along the plant holder arrangement on each side of the plant holder arrangement.

In an advantageous development of the invention, the outlet opening is provided with a protruding rim that directs the water to the front wall of a conduit. This will improve the water flow in the plant holder and will further reduce splashing and noise.

In a plant holder arrangement according to the invention, a plurality of plant holders are used, stacked on each other in a vertical direction. This provides a cost-effective hydroponic growth system which is easy to assemble.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
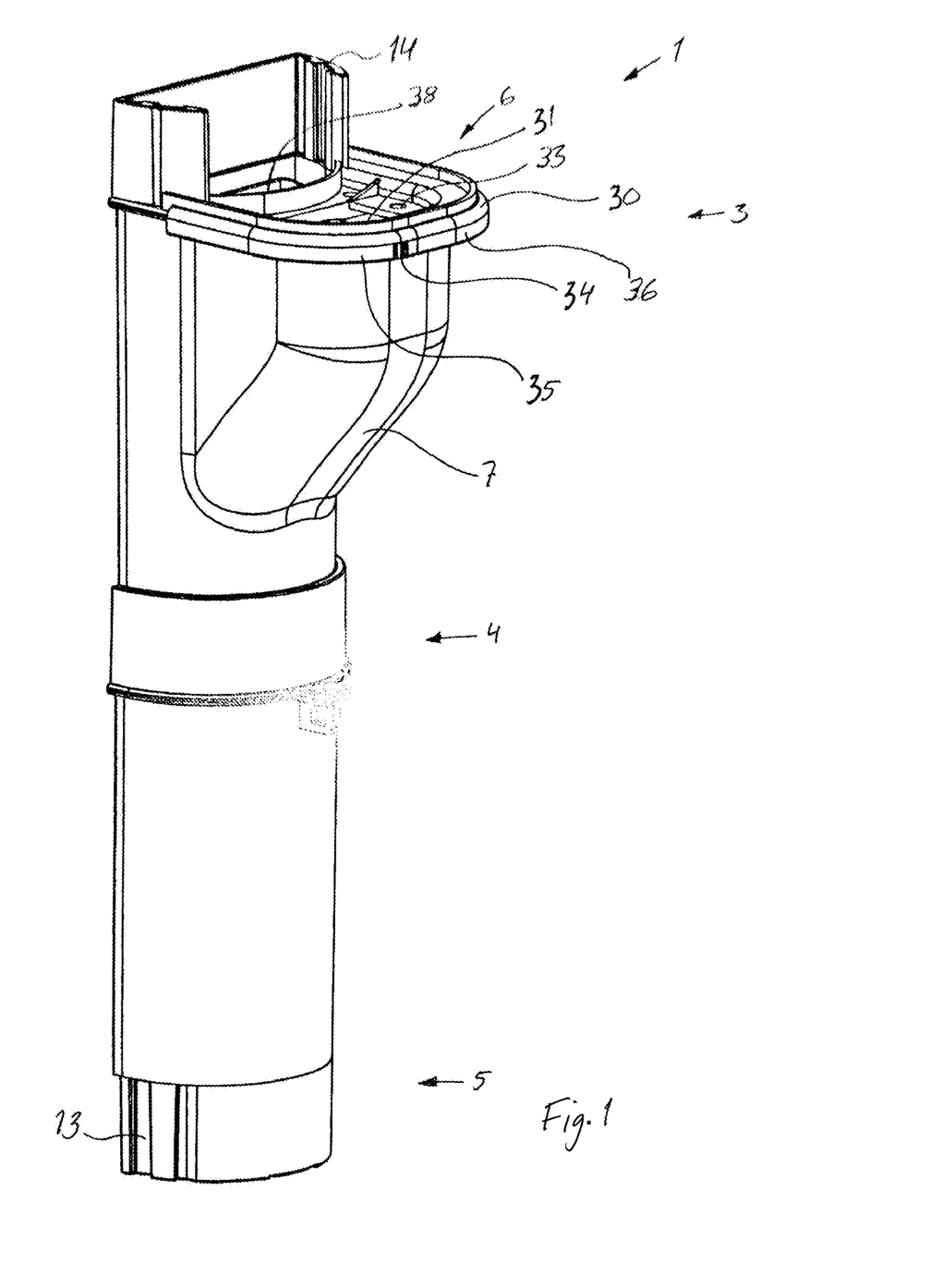
FIG. 1 shows a view of a first example of a plant holder according to the invention.
Figure 2:
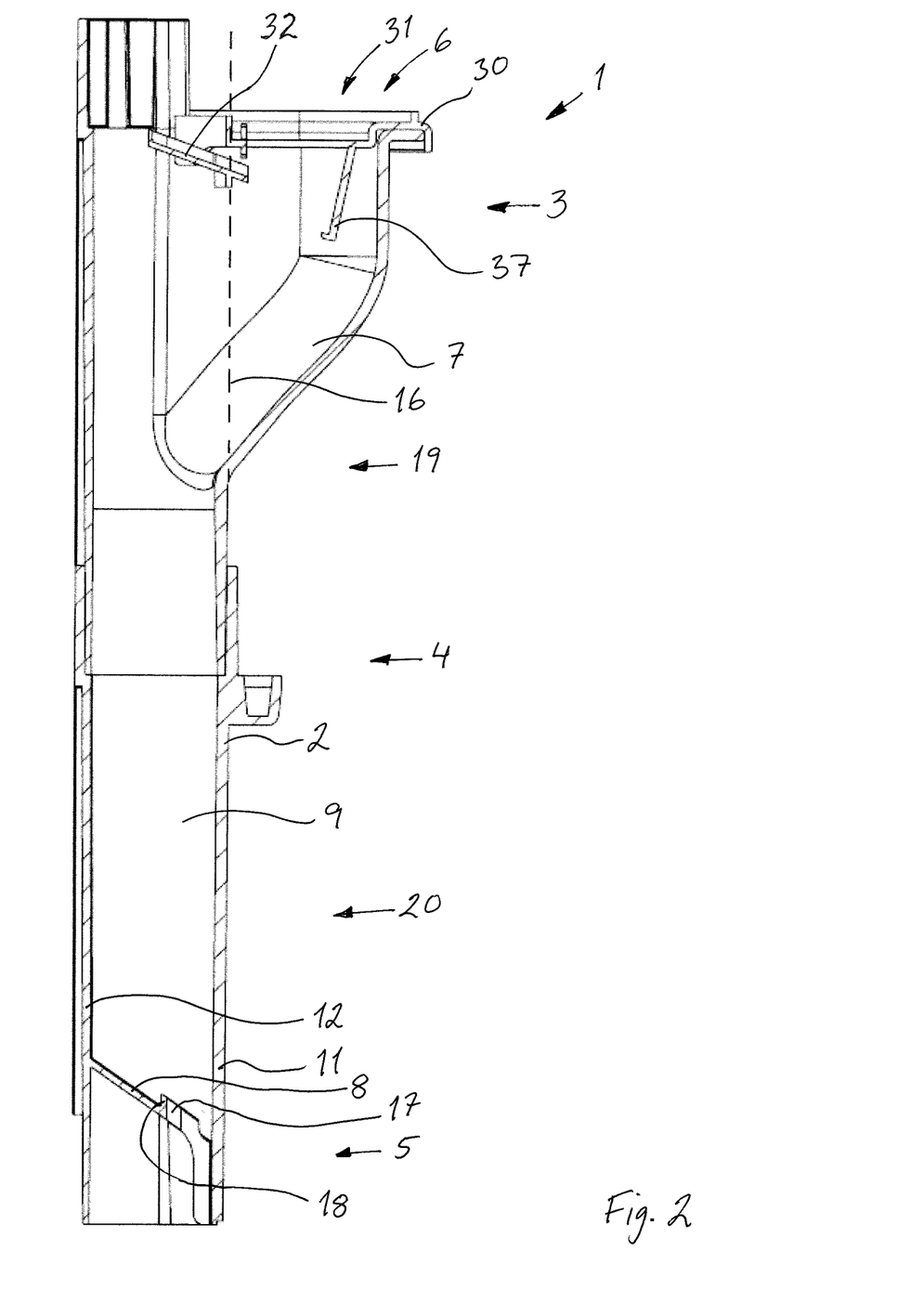
FIG. 2 shows a cut view of a first example of a plant holder according to the invention.

FIGS. 1 and 2 show a first example of a plant holder according to the invention. The plant holder 1 comprises a longitudinal body 2 shaped as a first conduit 9. In the shown example, the first conduit is semi-circular, but other shapes, such as a round or square shape would be possible. The body can be seen as part of a semi-circular tube having an outer periphery 16. The body 2 of the plant holder 1 comprises a top section 3, a middle section 4 and a bottom section 5. The top section is adapted to be connected to a bottom section of another plant holder, where the bottom section will be positioned inside the top section. The bottom section and the top section are preferably provided with one or more connecting means, e.g. comprising grooves 13 and protrusions 14, such that the plant holders can be positioned in a desired orientation when the plant holders are stacked on each other. In the shown example, the plant holders are provided with a dovetail shaped joint, where the bottom section is provided with two grooves forming a tail part and the top section is provided with two protrusions forming the socket part. Using connecting means comprising interlocking grooves and protrusions, the vertical stability of a stack of plant holders is improved.

The top section 3 of the plant holder 1 is provided with a plant hopper 7 having a plant mouth 6 adapted to hold a plant. The plant mouth is provided with a rim 12 that is used to support a lid 30 and/or a plant support. The plant hopper is arranged in the front wall 11 of the plant holder and extends out from the front wall 11. The plant mouth 6 is arranged outside of the periphery 16 of the plant holder, and is open towards the first conduit 9 such that the plant hopper and the first conduit forms a single void. The area of the plant mouth 6 is in the same order as the area of the first conduit 9, and part of the plant hopper has the same area. The lower part of the plant hopper is inclined towards the periphery of the plant holder, such that a sloping wall is obtained. The sloping wall will lead excessive water back to the first conduit. The plant holder is provided with a rear wall 12, which in the shown example is straight and flat. In this way it can be mounted to a flat surface, e.g. a building wall. The front wall and the rear wall may also be shaped as a circular tube.

The first conduit 9 is provided with a funnel-shaped sloping bottom wall 8 which slopes from the rear wall 12 towards the front wall 11 of the plant holder. The sloping bottom wall 8 is preferably arranged at the lower end of the middle section 4 or at the bottom section 5 such that there will be as much space as possible for the roots of a plant between the plant hopper 7 and the bottom wall 8. It is thus of advantage to arrange the bottom wall as low as possible in the first conduit.

The bottom wall 8 is provided with an outlet opening 17 positioned close the front wall of the body. The area of the outlet opening 17 is reduced when compared to the area of the first conduit, and is preferably less than a quarter of the area of the first conduit. The outlet opening will collect and transfer water from the first conduit to a collector plate of a following plant holder, as is detailed below. The outlet opening 17 is in the shown example provided with a protruding rim 18 that will lead the water to the front wall of the first conduit. This will improve the water flow further.

The plant holder consists in the shown example of two parts, an upper part 19 and a lower part 20. The upper part is attached to the lower part, either with connecting means or permanently, using e.g. glue or ultrasound welding. Each part is preferably injection moulded in a plastic or fibre composite material. The upper part and the lower part of the plant holder in the shown example can be produced in two part moulding tools, which is cost effective. In this way, no vertical joints are necessary which will reduce the risk of leakage.

The plant mouth of the plant holder is provided with a lid 30 adapted to hold a plant. The lid is adapted to be positioned at the plant mouth and will cover the complete plant mouth. The lid is provided with a plant opening 31 adapted to hold a porous fibre matrix for the plant. The lid preferably comprises one or more holding means 37 adapted to hold and support the fibre matrix. The lid further comprises a collector plate 32 adapted to lead water from the first conduit 9 of an adjacent plant holder positioned on top of the plant holder. The collector plate 32 extends into the first conduit 9 and will be positioned below the outlet opening 17 of an adjacent plant holder. The collector plate will lead the water from the outlet opening into the plant hopper. The collector plate 32 ends outside of the periphery 16 at the plant opening 31 such that the water is lead to the fibre matrix and thus to the roots of a plant.

One advantage of the inventive plant holder is that the water flow through the first conduit will not be blocked if a plant hopper is blocked. The plant hopper of a plant holder may sometimes be more or less clogged by an excessive amount of fibre matrix and/or roots or other foreign material in the plant hopper that may restrict the water flow passing the plant hopper. This is especially the case for plant holders having water channels where all the water passes the plant tray holding the plant. In the inventive solution, the water flow through a plant holder will not be restricted even if the plant hopper or the outlet of the collector plate is clogged. Should the water flow through a plant hopper be restricted, the water will flow over the rim 38 of that collector plate and will continue through the first conduit to the remaining plant holders in a plant holder arrangement without any restriction of the water flow.

The lid further comprises one or more ventilation holes 33, in the shown example four holes, which will allow air to circulate to and from the roots, even if the plant opening is completely filled up. The ventilation holes will also help to cool the plant. The flowing water will create a small airflow through the ventilation holes that will create a cooler microclimate around the plant. This will reduce the required total cooling of the room in which the plant is growing. Different types of lids may be used, depending on the type of plant it is adapted to hold.

The lid is preferably also injection moulded in a plastic or fibre composite material. The lid may be produced as a unitary part. In the shown example, the lid comprises a first part 35 and a second part 36, which are interconnected by a hinge 34. In this way, the lid can be opened by swinging the first part and the second part from each other. This will open the plant opening, which will simplify the removal of a plant with the fibre matrix without damaging the root of the plant, and the insertion of a new plant. The shown lid can also be produced in a two part moulding tool, which is cost effective.

Figure 3:
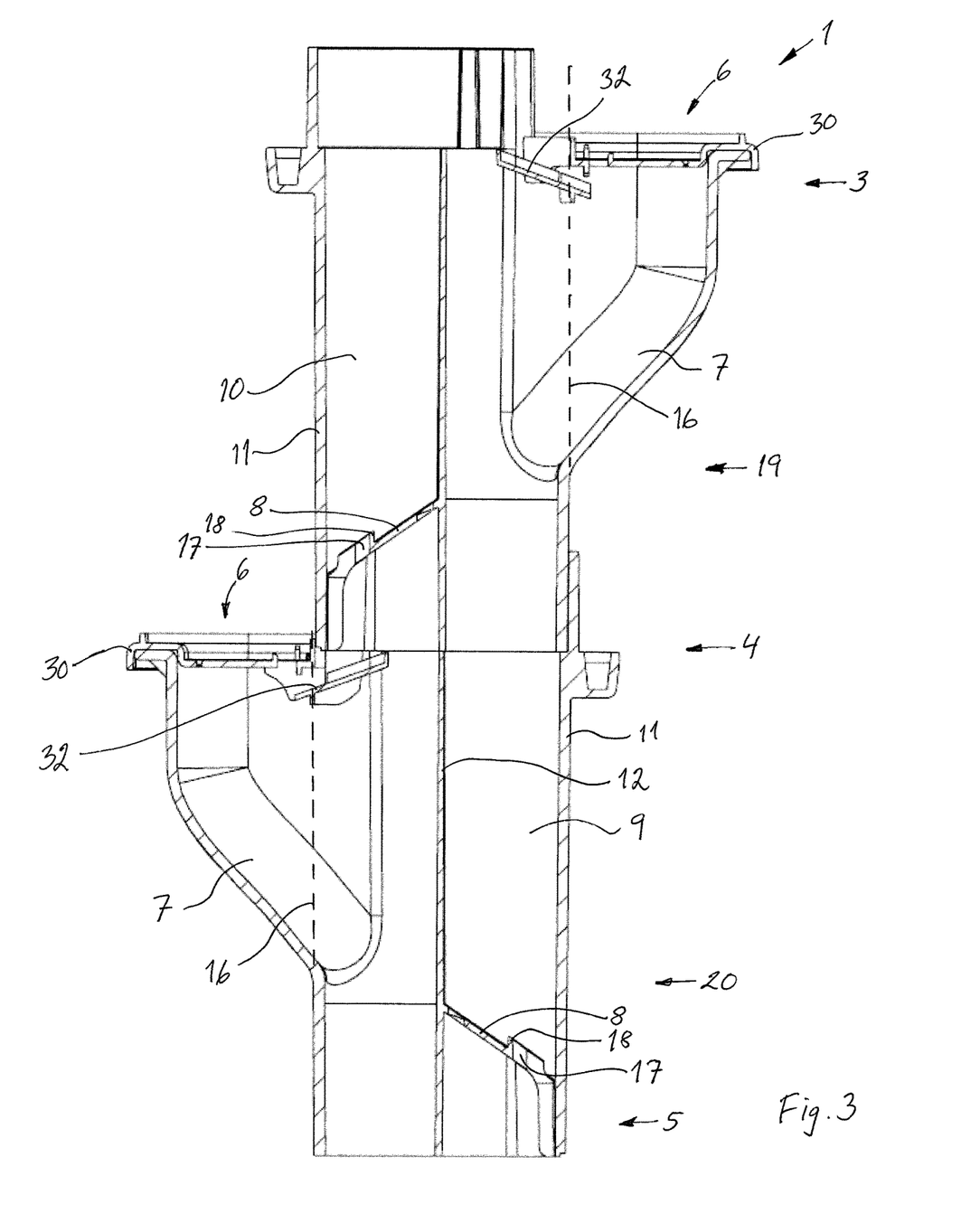
FIG. 3 shows a second example of a plant holder according to the invention.

FIG. 3 shows a second example of a plant holder according to the invention. The plant holder in this example comprises a first conduit 9 and a second conduit 10 arranged side by side. The rear wall of the first conduit is here integrated with the rear wall of the second conduit, such that two parallel longitudinally flow channels are created. In the shown example, the body of the plant holder is circular, but other shapes are possible. The plant hopper of each conduit are offset in a vertical direction, such that the plant hopper of the second conduit is arranged at the sloping bottom wall of the first conduit. In this way, plants can be grown on both sides of the plant holder, which allows for a space effective plant holder arrangement comprising such plant holders. Such a plant holder arrangement will have plant hoppers that are evenly distributed along the plant holder arrangement on each side of the plant holder arrangement.

The shown plant holder comprises a upper part 19 and a lower part 20. The upper part and the lower part are in the shown example identical. In this case, the upper part and the lower part are to be mounted to each other with a 180 degree rotation. The body of the plant holder can be seen as part of a tube having an outer periphery 16. The body 2 of the plant holder 1 comprises a top section 3, a middle section 4 and a bottom section 5. The top section is adapted to be connected to a bottom section of another plant holder, where the bottom section will be positioned inside the top section. The bottom section and the top section are preferably provided with one or more connecting means, e.g. comprising grooves 13 and protrusions 14, such that the plant holders can be positioned in a desired orientation when the plant holders are stacked on each other. In the shown example, the plant holders are provided with a dovetail shaped joint, where the bottom section is provided with two grooves forming a tail part and the top section is provided with two protrusions forming the socket part. Using connecting means comprising interlocking grooves and protrusions, the vertical stability of a stack of plant holders is improved.

The top section 3 of the plant holder 1 is provided with a plant hopper 7 having a plant mouth 6 adapted to hold a plant. The plant mouth is arranged outside of the periphery 16 of the plant holder and is provided with a rim 12 that is used to support the lid 30 and/or a plant support. A plant hopper is arranged in the front wall 11 of a conduit and extends out from the front wall, outside of the periphery 16 of the plant holder, and is open towards the first conduit 9 or the second conduit 10 such that the plant hopper and a conduit forms a single void. The area of the plant mouth 6 is in the same order as the area of a conduit, and part of the plant hopper has the same area. The lower part of the plant hopper is inclined towards the periphery of the plant holder, such that a sloping wall is obtained. The sloping wall will lead excessive water back to a conduit.

The first conduit 9 and the second conduit 10 are provided with a funnel-shaped sloping bottom wall 8 which slopes from the rear wall 12 towards the front wall of a conduit. The sloping bottom wall 8 of the first conduit 9 is preferably arranged at the lower end of the middle section 4 or at the bottom section 5 such that there will be as much space as possible for the roots of a plant between the plant hopper 7 and the bottom wall 8. It is thus of advantage to arrange the bottom wall as low as possible in the first conduit. The bottom wall of the second conduit is arranged at the middle section of the plant holder, just above the plant hopper of the second conduit. Since the plant holders are stacked on each other, the roots of a plant arranged in a plant hopper of the second conduit 10 will extend into the second conduit of an adjacent plant hopper.

The sloping bottom wall 8 is provided with an outlet opening 17 positioned close the front wall of a conduit. The area of the outlet opening 17 is reduced when compared to the area of a conduit, and is preferably less than a quarter of the area of a conduit. The outlet opening will collect and transfer water from a conduit to a collector plate of a lid arranged at a plant hopper. The outlet opening 17 is in the shown example provided with a protruding rim 18 that will lead the water to the front wall of a conduit. This will improve the water flow further.

The plant holder is preferably injection moulded in a plastic or fibre composite material. The upper and lower part of the plant holder in the shown example are identical and can be produced in the same two part moulding tool, which is cost effective.

The plant mouth is provided with a lid 30 adapted to hold the plant. The lid is adapted to be positioned at the plant mouth and will cover the complete plant mouth. The lid is provided with a plant opening 31 adapted to hold the porous fibre matrix for the plant. The lid preferably comprises one or more holding means 37 adapted to hold and support the fibre matrix. The lid further comprises a collector plate 32 adapted to lead water from a conduit of a plant holder positioned on top of the plant holder. The collector plate 32 extends into the conduit and will be positioned below the outlet opening 17 of a bottom wall 8. The collector plate will lead the water from the outlet opening into the plant hopper. The collector plate 32 ends at the plant opening 31 outside of the periphery of the plant holder such that the water is lead to the fibre matrix and thus to the roots of a plant.

One advantage of the inventive plant holder is that the water flow through the first and second conduits will not be blocked if a plant hopper is blocked. The plant hopper of a plant holder may sometimes be more or less clogged by an excessive amount of fibre matrix and/or roots or other foreign material in the plant hopper that may restrict the water flow passing the plant hopper. This is especially the case for plant holders having water channels where all the water passes the plant tray holding the plant. In the inventive solution, the water flow through a plant holder will not be restricted even if the plant hopper or the outlet of the collector plate is clogged. Should the water flow through a plant hopper be restricted, the water will flow over the rim 38 of that collector plate and will continue through the conduit to the remaining plant holders in a plant holder arrangement without any restriction of the water flow.

The lid further comprises one or more ventilation holes 33, in the shown example four holes, which will allow air to circulate to and from the roots, even if the plant opening is completely filled up. The ventilation holes will also help to cool the plant. The flowing water will create a small airflow through the ventilation holes that will create a cooler microclimate around the plant. This will reduce the required total cooling of the room in which the plant is growing. Different types of lids may be used, depending on the type of plant it is adapted to hold.

The lid is preferably also injection moulded in a plastic or fibre composite material. The lid may be produced as a unitary part. In the shown example, the lid comprises a first part 35 and a second part 36, which are interconnected by a hinge 34. In this way, the lid can be opened by swinging the first part and the second part from each other. This will open the plant opening, which will simplify the removal of a plant with the fibre matrix without damaging the root of the plant, and the insertion of a new plant. The shown lid can also be produced in a two part moulding tool, which is cost effective.

Figure 4:
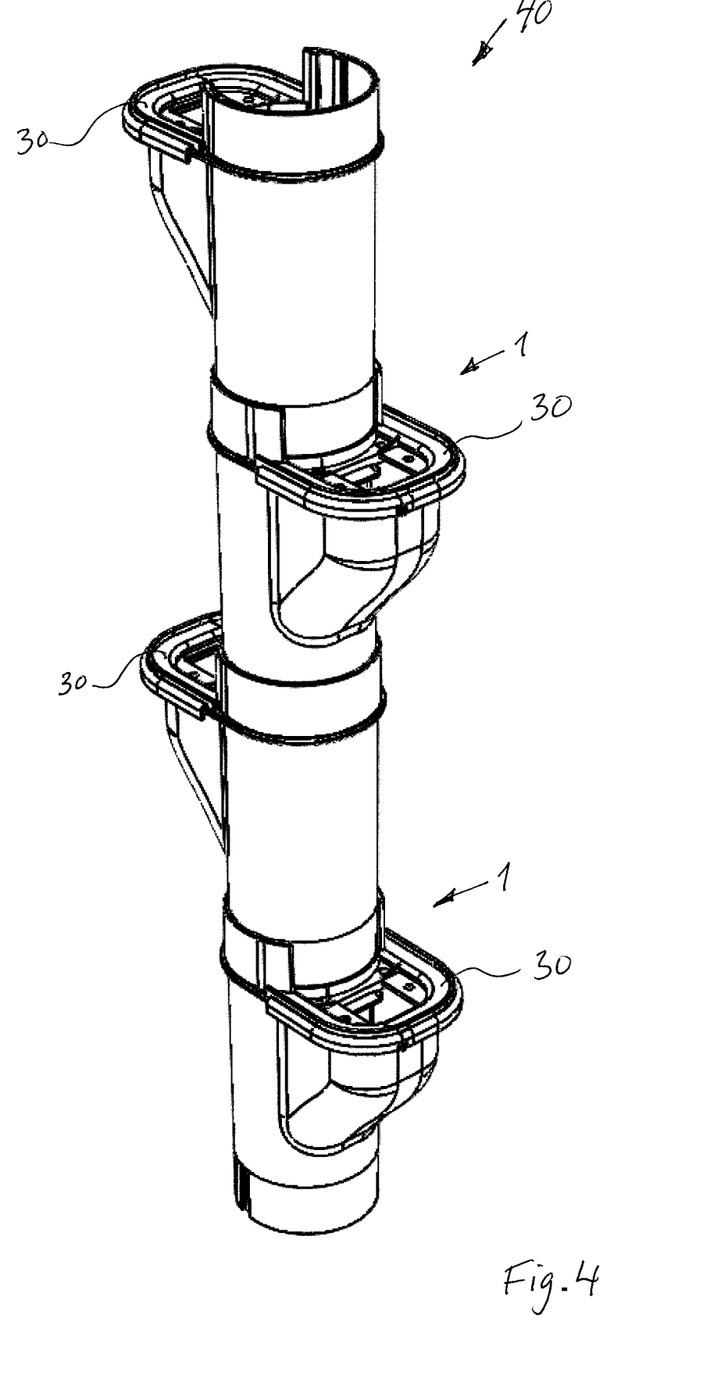
FIG. 4 shows a view of a plant holder arrangement according to the invention to be used in a hydroponic growth system.

FIG. 4 shows a plant holder arrangement 40 comprising a plurality of stacked plant holders 1 to be used in a hydroponic growth system. In the shown plant holder arrangement, every other plant hopper is offset by 180 degrees. In this way, every other plant hopper will be positioned at the same side. The water that has passed a plant and the plant hopper will flow through the conduit and will be collected by the sloping bottom wall of the conduit. The water will exit the outlet opening and will be collected by the collector plate of a lid which leads the water to a plant arranged in the plant opening of a plant mouth. The water continues down in the conduit into the next plant holder.

The plant holder arrangement further comprises an upper intake closure (not shown) shaped to fit on top of a plant holder. The intake closure includes fluid conduits adapted to lead water to the first conduit and the second conduit. The plant holder arrangement will also comprise a bottom adapter (not shown) that will hold the lowest plant holder and let the water run into a collecting vessel, from where it is transferred to the upper intake closure again.

The invention is not to be regarded as being limited to the embodiments described above, a number of additional variants and modifications being possible within the scope of the subsequent patent claims.

REFERENCE SIGNS

1: Plant holder
2: Body
3: Top section
4: Middle section
5: Bottom section
6: Plant mouth
7: Plant hopper
8: Bottom wall
9: First conduit
10: Second conduit
11: Front wall
12: Rear wall
13: Connecting groove
14: Connecting protrusion
15: Rim
16: Periphery
17: Outlet opening
18: Rim of outlet opening
19: Upper part
20: Lower part
30: Lid
31: Plant opening
32: Collector plate
33: Ventilation hole
34: Hinge
35: First part
36: Second part
37: Holding means
38: Rim of collector plate
40: Plant holder arrangement

The invention claimed is:

1. A plant holder for a hydroponic growth system, comprising:
a body having a top section, a middle section and a bottom section, where the plant holder further comprises a first conduit having a rear wall and a front wall, a plant hopper with a plant mouth arranged at the top section, where the first conduit comprises a sloping bottom wall having an outlet opening arranged at the bottom section, wherein the plant holder further comprises a lid arranged at the plant mouth, where the lid comprises a collector plate extending from the interior of the first conduit into the plant hopper, where the collector plate ends outside of a periphery of the plant holder, wherein the rear wall is straight and flat, and the front wall is curved.

2. A plant holder according to claim 1, wherein the plant holder consists of two parts, where an upper part comprises the plant hopper and a lower part comprises the sloping bottom wall.

3. A plant holder according claim 1, wherein the plant holder comprises a second conduit arranged adjacent the first conduit.

4. A plant holder according to claim 3, wherein the plant holder consists of an upper part and a lower part attached to each other.

5. A plant holder according to claim 1, wherein an outer dimension of the bottom section is smaller than an inner dimension of the top section, such that the bottom section of a plant holder can be inserted in a top section of another plant holder.

6. A plant holder according to claim 1, wherein the collector plate comprises a rim.

7. A plant holder according to claim 1, wherein the lid is provided with at least one ventilation hole.

8. A plant holder according to claim 1, wherein the lid is injection molded as a unitary part.

9. A plant holder arrangement comprising a plurality of plant holders according to claim 1, where the plurality of plant holders are attached to each other in a vertical manner.

10. A plant holder arrangement according to claim 9, wherein the plant holder arrangement further comprises an upper intake closure including fluid conduits adapted to lead water to the first conduit and a bottom adapter that will hold the lowest plant holder and let the water run into a collecting vessel.

11. A plant holder for a hydroponic growth system, comprising:
a body having a top section, a middle section and a bottom section, where the plant holder further comprises a first conduit having a rear wall and a front wall, a plant hopper with a plant mouth arranged at the top section, where the first conduit comprises a sloping bottom wall having an outlet opening arranged at the bottom section, wherein the plant holder further comprises a lid arranged at the plant mouth, where the lid comprises a collector plate extending from an interior of the first conduit into the plant hopper, where the collector plate ends outside of a periphery of the plant holder, wherein the plant holder comprises a second conduit arranged adjacent the first conduit and wherein the second conduit is provided with a rear wall and a front wall, a plant hopper with a plant mouth arranged at the middle section, where the second conduit comprises a sloping bottom wall having an outlet opening arranged at the middle section, and where the plant holder comprises a lid arranged at the plant mouth, where the lid comprises a collector plate extending from an interior of the second conduit into the plant hopper, where the collector plate ends outside of the periphery of the plant holder.

12. A plant holder for a hydroponic growth system, comprising:
a body having a top section, a middle section and a bottom section, where the plant holder further comprises a first conduit having a rear wall and a front wall, a plant hopper with a plant mouth arranged at the top section, where the first conduit comprises a sloping bottom wall having an outlet opening arranged at the bottom section, wherein the plant holder further comprises a lid arranged at the plant mouth, where the lid comprises a collector plate extending from an interior of the first conduit into the plant hopper, where the collector plate ends outside of a periphery of the plant holder, wherein the plant holder comprises a second conduit arranged adjacent the first conduit and wherein the rear wall of the first conduit is integrated with the rear wall of the second conduit.

13. A plant holder for a hydroponic growth system, comprising:
a body having a top section, a middle section and a bottom section, where the plant holder further comprises a first conduit having a rear wall and a front wall, a plant hopper with a plant mouth arranged at the top section, where the first conduit comprises a sloping bottom wall having an outlet opening arranged at the bottom section, wherein the plant holder further comprises a lid arranged at the plant mouth, where the lid comprises a collector plate extending from an interior of the first conduit into the plant hopper, where the collector plate ends outside of a periphery of the plant holder, wherein the plant holder comprises a second conduit arranged adjacent the first conduit, wherein the plant holder consists of an upper part and a lower part attached to each other and wherein the plant hopper of the first conduit and the sloping bottom wall of the second conduit are arranged in the upper part, and that the plant hopper of the second conduit and the sloping bottom wall of the first conduit are arranged in the lower part.

14. A plant holder for a hydroponic growth system, comprising:
- a body having a top section, a middle section and a bottom section, where the plant holder further comprises a first conduit having a rear wall and a front wall, a plant hopper with a plant mouth arranged at the top section, where the first conduit comprises a sloping bottom wall having an outlet opening arranged at the bottom section, wherein the plant holder further comprises a lid arranged at the plant mouth, where the lid comprises a collector plate extending from an interior of the first conduit into the plant hopper, where the collector plate ends outside of a periphery of the plant holder wherein the lid comprises a first part and a second part interconnected by a hinge.

* * * * *